(12) United States Patent
Cobb

(10) Patent No.: US 10,669,431 B2
(45) Date of Patent: Jun. 2, 2020

(54) METHOD OF CONTROLLING A PAINT COMPOSITION

(71) Applicant: Chroma Australia Pty Limited, Mount Kuring-gai, NSW (AU)

(72) Inventor: James Campbell Cobb, Julatten (AU)

(73) Assignee: Chroma Australia Pty Limited, New South Wales (AU)

( * ) Notice: Subject to any disclaimer, the term of this patent is extended or adjusted under 35 U.S.C. 154(b) by 100 days.

(21) Appl. No.: 15/564,243

(22) PCT Filed: Apr. 15, 2016

(86) PCT No.: PCT/AU2016/050281
§ 371 (c)(1),
(2) Date: Oct. 4, 2017

(87) PCT Pub. No.: WO2016/164985
PCT Pub. Date: Oct. 20, 2016

(65) Prior Publication Data
US 2018/0127596 A1 May 10, 2018

(30) Foreign Application Priority Data
Apr. 15, 2015 (AU) .............................. 2015901355

(51) Int. Cl.
| | | |
|---|---|---|
| *C09D 5/06* | (2006.01) | |
| *C09D 7/43* | (2018.01) | |
| *C09D 7/63* | (2018.01) | |
| *C09D 7/80* | (2018.01) | |
| *C09D 7/41* | (2018.01) | |
| *C08K 5/17* | (2006.01) | |
| *C09D 133/08* | (2006.01) | |

(52) U.S. Cl.
CPC ................. *C09D 5/06* (2013.01); *C08K 5/17* (2013.01); *C09D 7/41* (2018.01); *C09D 7/43* (2018.01); *C09D 7/63* (2018.01); *C09D 7/80* (2018.01); *C09D 133/08* (2013.01)

(58) Field of Classification Search
CPC ... C09D 5/06; C09D 7/43; C09D 7/63; C09D 7/80; C09D 7/41; C09D 133/08; C08K 5/17
USPC .......................................................... 524/186
See application file for complete search history.

(56) References Cited

U.S. PATENT DOCUMENTS 5,270,380 A  12/1993  Adamson et al.

FOREIGN PATENT DOCUMENTS

WO  WO 2007/009161 A1  1/2007

OTHER PUBLICATIONS

International Search Report and Written Opinion for International Application No. PCT/AU2016/050281 dated Jul. 18, 2016. (10 pages).
Kevin W. McCreight et al., Development of Low VOC Additives to Extend the Wet Edge and Open Time of Aqueous Coatings, Progress in Organic Coatings, 2011, 72, 102-108.

*Primary Examiner* — Ling Siu Choi
*Assistant Examiner* — Ronald Grinsted
(74) *Attorney, Agent, or Firm* — Haynes and Boone, LLP

(57) ABSTRACT

This invention relates to a method of controlling a water-based, acrylic, artists' paint composition comprising an alkali and alcohol soluble polymer and a substituted amine using an alcohol solution.

18 Claims, No Drawings

METHOD OF CONTROLLING A PAINT COMPOSITION

FIELD

This invention relates to a method of controlling a water-based, acrylic, artists' paint composition using an alcohol solution.

BACKGROUND

Many artists use acrylic paints which air dry as water leaves the paint. As water evaporates or is absorbed by the substrate to which the paint is applied, acrylic polymer particles coalesce into a continuous adhesive film. Within a relatively short period of time, approximately 10 to 15 minutes, a skin forms over the outer surface of the paint film. At this stage the paint film is said to be "dry to the touch". The thicker films continue to dry over time, the length of time varying with the thickness of the film. For very thin films this may be a few minutes while films half a centimetre in thickness or more may take quite some time longer.

Once the acrylic particles coalesce, the film can no longer be worked. The artist is not able to change and adapt what is taking place on the canvas using traditional techniques. Although the dry film could be painted over, the "wet in wet" painting techniques are severely curtailed. The term "wet in wet" is used by persons skilled in the art to refer to painting techniques by which the artist creatively works and develops the wet paint on the substrate, adding, blending and altering the appearance over time to achieve the desired artistic result.

Temperature, humidity and air flow are environmental factors that influence the drying times of acrylic paint compositions. The time taken for a paint film to skin over can be extended somewhat by reducing air-flow, lowering temperature and increasing humidity. Manipulating such environmental factors may not always be possible or practical. Low temperatures (below about 9° C.) may interfere with coalescence of the polymer particles resulting in paint film cracking, becoming powdery or failing to adhere to the substrate. Optimum humidity may be difficult to determine and maintain.

The nature of the substrate also influences the drying time of acrylic paint compositions. An absorbent substrate will draw moisture out of the paint composition and speed drying time. Sealing the substrate to reduce absorbency or selecting a non-absorbent substrate such as metal or masonite will reduce the moisture lost through the substrate. Using a moist substrate can also reduce moisture lost through the substrate and increase humidity in the environment of the paint. By soaking the back of a canvas with water or attaching wet rags or sponges to the back of a canvas, for example, the rate of drying of the paint film can be reduced. This technique has limitations and the water may also wash impurities out of the canvas into the paint film causing discoloration.

Humectants, such as glycerin or propylene glycol may be used as paint additives to extend the time taken for a paint film to skin over. As paint additives however, humectants tend to linger in the paint film. They can remain tacky and adversely affect outer coat adhesion. Most importantly they do not prevent fast drying of thin films of paint.

The present inventor has previously found that a water based, acrylic, air dried, artists' paint composition with improved "open time" properties can be obtained by including an alkali soluble polymer and specific substituted amines into a conventional acrylic artists paint composition. The "open time" of the resulting composition could be extended provided the artist continually applied water to the paint composition. The extended "open time" provided the artist with a longer time to use the "wet in wet" painting technique. This is described in WO 2007/009161, the contents of which are incorporated herein.

However, the artist loses the opportunity to paint "wet in wet" once the paint composition has dried. The need for the artist to be vigilant in observing the wetness of the paint composition and continuously apply water to the paint composition while working "wet in wet" is time consuming, inhibitive to the artists creativity and clumsy. Further, this technique is not useful for an artist painting on a large scale where sections of the painting dry earlier than others as the artist is required to be watchful of the wetness of the paint composition over a number of different areas of the painting at any one time over a very large area. Accordingly, the inventor has recognised the need for an improvement in accessing, extending and/or controlling the "open-time" of an artists paint composition.

Any discussion of documents, acts, materials, devices, articles or the like which has been included in the present specification is not to be taken as an admission that any or all of these matters form part of the prior art base or were common general knowledge in the field relevant to the present invention as it existed before the priority date of each claim of this application.

DISCLOSURE

In research leading up to the present disclosure, the inventor has identified the need for a more convenient way to access and control the "open time" of a water based, acrylic, artists' paint composition so as to allow the "wet in wet" technique to be more easily adopted and maintained.

The present inventor has surprisingly found that the "open time" of an acrylic, artists' paint composition that includes an alkali and alcohol soluble polymer together with a substituted amine that has been applied to a substrate and subsequently dried, can be easily re-opened by the addition of an alcohol solution, thereby allowing the "open time" of the paint composition to be further controlled.

Previously, an artist had to ensure that the paint composition was always in the "wet state" by the continuous addition of water and optionally other mediums, as was required when painting with the inventors previous acrylic artists paint composition as hereinbefore described. According to the present invention, the ability to further extend the open time of an artists' paint composition or re-access or re-open the "open-time" of an artists' paint composition which is not in its wet state, by the addition of an alcohol solution, has surprisingly provided a simple, convenient and flexible way for artists' to work "wet in wet" without needing to be vigilant about the drying process. It has the advantage in that, an artist's paint composition as described herein, can be allowed to dry to a state in which the paint composition is unworkable and then, through the addition of an alcohol solution, the "open time" of the paint composition can be re-accessed or re-opened. It also allows the open time of the artist's paint composition disclosed herein to be extended through the addition of an alcohol solution. Even more advantageous for an artist, is the ability to "re-open" or "rewet" a specific part of the painting, at any convenient time, to re-work the paint composition. One advantage of the present invention is that it is no longer necessary for the artists to be continually vigilant with regard to the drying of their paint composition. For the artist, the method described herein advantageously extends the wet working time of the paint composition once applied to a substrate and also enables the artist to re-access or re-open the open time of recently dried paint, thereby giving the artist more flexibility while painting wet on wet.

The present disclosure utilises a water based, acrylic artists' paint composition containing at least one water dispersible acrylic polymer, at least one alkali and alcohol soluble polymer (AASP) and at least one substituted amine in an amount effective to adjust the pH to about 8 to about 11 that has been applied to a substrate and allowed to dry. The improvement resides in the ability to further extend the open time of an artists paint composition or re-open or re-access the "open-time" of the dried paint composition disclosed herein by contacting the paint composition with an alcohol solution.

The present inventor has surprisingly found that the open time of the artists paint composition as disclosed herein, can be extended, re-accessed or re-opened with the addition of an alcohol solution thereby allowing the "open time" to be controlled to free the artist to develop the artistic work over an extended time.

In relation to extending the "open time", the paint composition comprising AASP and substituted amine, as disclosed herein, sets gradually over time rather than developing a paint skin in the normal way, for example, within about 15 minutes as is the case for conventional paints. A wet paint composition comprising an AASP and a substituted amine, as disclosed herein, may be applied over a similarly composed wet paint composition already on a substrate and may be blended with it and into it using a "wet in wet" technique. This technique gives artists time to create complex paintings while working at their own pace and with ample opportunity to revise and alter their work. According to the method disclosed herein, once the paint composition on the substrate or the palette has begun to dry and becomes unworkable or even if it has completely dried, it can be re-opened or rewet by contacting the paint composition with an alcohol solution, preferably an aqueous alcohol solution. In another embodiment, the disclosed method allows the open time of a paint composition as described herein to be extended. This may be done, for example, by spraying the paint composition with the alcohol solution or applying the alcohol solution to the paint composition with a brush. The open time of the rewet paint composition can then be extended and/or controlled for any desired period, for example up to several hours or up to several days by the addition of an alcohol solution.

In one embodiment, the present invention provides a method of controlling a paint composition by re-accessing or re-opening the "open time" of a water-based, acrylic artists' paint composition, comprising AASP and substituted amine as disclosed herein, which is no longer in a wet, workable state. This is achieved by rewetting or re-opening the open time of the paint composition with an alcohol solution. Once the "open time" has been re-opened by the addition of the alcohol solution, the paint composition can be further manipulated by the further addition of one or more mediums selected from the group consisting of: water; a medium comprising an aqueous alcohol; a medium comprising an alcohol and alkali soluble polymer and at least one substituted amine; and a medium comprising at least one water dispersible acrylic polymer.

In one aspect disclosed herein, there is provided a method of re-accessing the open time of an unworkable artists' paint composition, wherein the paint composition comprises:

i) at least one alkali and alcohol soluble polymer (AASP) said polymer being selected from the group consisting of polymers soluble at ambient temperature and pressure in an aqueous solution having a pH of from about 7 to about 11 and an alcohol; and ii) at least one substituted amine in an amount effective to adjust the pH to about 8 to about 11, said amine selected from the group consisting of $C_{1-6}$ alcohol amines, $C_{1-6}$ alkyl $C_{1-6}$ alcohol amines and mixtures thereof;

the method comprising contacting the unworkable paint composition with an alcohol solution in an amount effective to re-access the open time of the unworkable paint composition and form a workable paint composition.

Said another way, there is disclosed a method of rewetting an artists' paint composition which is in an unworkable state, wherein the artists paint composition comprises:

i) at least one alkali and alcohol soluble polymer (AASP) in an amount effective to increase the open time of the composition, said polymer being selected from the group consisting of polymers soluble at ambient temperature and pressure in an aqueous solution having a pH of from about 7 to about 11 and an alcohol and ii) at least one substituted amine in an amount effective to adjust the pH to about 8 to about 11, said amine selected from the group consisting of $C_{1-6}$ alcohol amines, $C_{1-6}$ alkyl $C_{1-6}$ alcohol amines and mixtures thereof;

the method comprising contacting the artists' paint composition with an alcohol solution in an amount sufficient to wet the artists' paint composition so that it is in a workable state.

In another aspect, there is disclosed a workable paint composition obtained by the method described in the above aspects.

In another aspect, there is disclosed a method of painting a substrate comprising:

applying to the substrate a workable paint composition and contacting the artists' paint composition with an alcohol solution in an amount sufficient to wet the artists' paint composition so that it is in a workable state, wherein the paint composition comprises i) at least one alkali and alcohol soluble polymer (AASP) in an amount effective to increase the open time of the composition, said polymer being selected from the group consisting of polymers soluble at ambient temperature and pressure in an aqueous solution having a pH of from about 7 to about 11 and an alcohol;

ii) at least one substituted amine in an amount effective to adjust the pH to about 8 to about 11, said amine selected from the group consisting of $C_{1-6}$ alcohol amines, $C_{1-6}$ alkyl $C_{1-6}$ alcohol amines and mixtures thereof; and iii) a binding effective amount of at least one water dispersible acrylic polymer.

In one embodiment of the above aspect, the paint composition is applied to the substrate and allowed to dry to a semi-wet state, such that the paint composition is transitioning from a wet to a dry state. In another embodiment, the paint composition is applied to the substrate and allowed to dry to an unworkable state.

In another aspect, there is disclosed a method of painting a substrate comprising:

applying to the substrate a workable paint composition
allowing the paint composition to dry to an unworkable state; and contacting the artists' paint composition with an alcohol solution in an amount sufficient to wet the artists' paint composition so that it is in a workable state, wherein the paint composition comprises i) at least one alkali and alcohol soluble polymer (AASP) in an amount effective to increase the open time of the composition, said polymer being selected from the group consisting of polymers soluble at ambient temperature and pressure in an aqueous solution having a pH of from about 7 to about 11 and an alcohol;

ii) at least one substituted amine in an amount effective to adjust the pH to about 8 to about 11, said amine selected from the group consisting of $C_{1-6}$ alcohol amines, $C_{1-6}$ alkyl $C_{1-6}$ alcohol amines and mixtures thereof; and iii) a binding effective amount of at least one water dispersible acrylic polymer.

In one embodiment, the alcohol solution is applied to portions or section of the paint composition at a time. This is particularly relevant when an artist is painting on a large substrate such that sections of the paint composition are drying at different times.

In yet another aspect disclosed herein, there is provided a method of controlling the open time of a workable water-based acrylic artists' paint composition comprising at least one alkali and alcohol soluble polymer (AASP) and at least one substituted amine selected from the group consisting of $C_{1-6}$ alcohol amines, $C_{1-6}$ alkyl $C_{1-6}$ alcohol amines and mixtures thereof in an amount effective to adjust the pH to about 8 to about 11, the method comprising contacting the paint composition with an alcohol solution and optionally one or more of the group consisting of:

(a) water; and (b) a medium comprising at least one alkali soluble polymer and at least one substituted amine selected from the group consisting of $C_{1-6}$ alcohol amines, $C_{1-6}$ alkyl $C_{1-6}$ alcohol amines and mixtures thereof in an amount effective to adjust the pH to about 8 to about 11; and (c) a medium comprising at least one water dispersible acrylic polymer.

The effect of the above method is to allow the artists to extend and then control the open time of the paint composition on the canvas, In one embodiment, the open time of the workable water-based acrylic artists' paint composition is obtained by treating an unworkable dried water-based acrylic artists' paint composition with an alcohol solution.

In another embodiment, the workable water-based acrylic artists' paint composition is obtained by a method according to the aspects disclosed above.

Accordingly, in another aspect there is disclosed a method of accessing and controlling the open time of an unworkable water-based acrylic artists' paint composition comprising at least one alkali and alcohol soluble polymer (AASP) and at least one substituted amine selected from the group consisting of $C_{1-6}$ alcohol amines, $C_{1-6}$ alkyl $C_{1-6}$ alcohol amines and mixtures thereof in an amount effective to adjust the pH to about 8 to about 11, the method comprising contacting the unworkable paint composition with an alcohol solution and optionally one or more of the group consisting of:

(a) water; and (b) a medium comprising at least one alkali soluble polymer and at least one substituted amine selected from the group consisting of $C_{1-6}$ alcohol amines, $C_{1-6}$ alkyl $C_{1-6}$ alcohol amines and mixtures thereof in an amount effective to adjust the pH to about 8 to about 11; and (c) a medium comprising at least one water dispersible acrylic polymer.

In one embodiment, contacting the paint composition with the alcohol solution and optionally one or more of a)-c) as described above takes place periodically so as to provide a workable paint composition.

By "periodically" it will be understood to mean contact with the alcohol solution and optionally one or more of a)-c) as defined above occurs more than once over a period of time so as to maintain a workable paint composition, i.e. a paint composition that is fluid and able to be blended and altered. Said another way, the alcohol solution and mediums a)-c) may be contacted with the paint composition from time to time or as needed, which may or may not be regular, to maintain a workable paint composition.

It will be appreciated that once the "open time" of the paint composition has been extended or re-opened or accessed with alcohol solution, the "open time" of the paint composition is prolonged while ever the alcohol solution is present, due to the presence of the AASP and substituted amine as herein described. According to the above methods of the invention, the "open time" of a paint composition, comprising AASP and amine as herein described, that is no longer in its wet state is able to be accessed or re-opened by contacting or re-wetting with the alcohol solution.

In one embodiment, the paint composition, comprises AASP in an amount effective to increase the open time of the paint composition and sufficient amine to solubilise the AASP, therefore once the paint composition is re-wet with the alcohol solution the open time is extended for as long as the artist requires, by the addition of more alcohol solution.

When a conventional paint composition dries, the acrylic binder, namely the water dispersible acrylic polymer, coalesces when water evaporates. According to the paint composition disclosed herein, in the presence of AASP and amine, the water dispersible acrylic polymer is prevented from forming a skin as the water evaporates. The AASP is solubilised by the amine. Whilst not wishing to be bound by theory, it is believed that the solubilised AASP forms a coating around the dispersion polymer particles preventing coalescence of those particles. A water resistant film is formed only when the amine begins to evaporate and the AASP themselves become water resistant. According to the present invention, once the paint composition dries or begins to dry through evaporation of water and amine and is no longer workable (i.e is in an unworkable state), the artist can simply contact the paint composition with an alcohol solution to rewet the paint composition and access or re-open the "open time". The inventor believes that the alcohol solution resolubilises the AASP which in turn causes the paint to rewet because the dispersion polymer is carried within the coating of AASP in the water phase.

It will be understood that rewetting with the alcohol solution is carried out whilst the paint composition disclosed herein still contains substituted amine as defined herein.

The inventor has observed that rewetting with alcohol is easier to carry out soon after the paint composition has begun to dry rather than at some later period. It will be understood that the "open time" of the paint composition described herein may be re-opened or accessed with the addition of alcohol solution provided the substituted amine has not completely evaporated. Accordingly, it will be understood that "soon after" the paint composition has begun to dry means that a large amount of substituted amine is still present in the paint composition, whereas "some later period" means that a small amount of the substituted amine is present in the paint composition on account of the fact that the amine has evaporated over time. It will be appreciated that the speed at which the amine evaporates will depend on the conditions of the surrounding environment (particularly the temperature and humidity).

In one embodiment, rewetting with alcohol solution is easier and more effective within a few hours up to 12 hours of the paint composition drying and becomes progressively more difficult to solubilise as the amine evaporates and accordingly is more difficult 3-5 days after the paint composition has dried.

Accordingly, in one embodiment, the alcohol solution is applied to the paint composition in the range of within an hour up to 5 days of the paint composition drying. In another embodiment, the alcohol solution is applied to the paint composition in the range of within an hour up to 3 days of the paint composition drying. In another embodiment, the alcohol solution is applied to the paint composition in the range of within an hour up to 12 hours of the paint composition drying. In yet another embodiment, the alcohol solution is applied to the paint composition in the range of within an hour up to 6 hours of the paint composition drying. In yet another embodiment, the alcohol solution is applied to the paint composition in the range of up to 1 hour to 36 hours, up to 1 hour to 24 hours, up to 1 hour to 24 hours, up to 1 hour to 6 hours, or up to 1 hour to 3 hours of the paint composition drying. Accordingly, the present inventor believes that the presence of amine in the film of the paint composition assists in the rewetting process, it is believed that it facilitates the alcohol in re-solubilising the AASP so that re-solubilisation and thus rewetting of the film of the paint composition is quicker when alcohol and amine are present in comparison to there being no or very little amine present. Accordingly, in the method of the invention, the paint composition becomes less re-wettable as the amine evaporates.

In one embodiment the alkali and alcohol soluble polymer (AASP) is in an amount effective to control the open time of the paint composition.

In one embodiment the alkali and alcohol soluble polymer is in an amount effective to re-wet a paint composition and/or extend the open time of the paint composition.

In one embodiment, the water-based artists' paint composition used in the methods disclosed herein comprises:

at least one pigment in an effective amount to provide the desired pigmentation;

at least one alkali and alcohol soluble polymer (AASP) in an amount effective to increase the open time of the composition, said polymer being selected from the group consisting of polymers soluble at ambient temperature and pressure in an aqueous solution having a pH of from about 7 to 11 and an alcohol solution;

at least one substituted amine in an amount effective to adjust the pH to about 8 to 11, said amine selected from the group consisting of $C_{1-6}$ alcohol amines, $C_{1-6}$ alkyl $C_{1-6}$ alcohol amines and mixtures thereof;

a binding effective amount of at least one water dispersible acrylic polymer; and an effective amount of at least one alkali soluble or alkali swellable thickener.

The paint composition also optionally includes one or more conventional additives such as dispersants, rheology modifiers, defoamers, coalescents and preservatives.

In another aspect, there is disclosed herein a water-based acrylic artists' paint composition comprising:

at least one pigment in an effective amount to provide the desired pigmentation;

at least one alkali and alcohol soluble polymer (AASP) in an amount effective to increase the open time of the composition, said polymer being selected from the group consisting of polymers soluble at ambient temperature and pressure in an aqueous solution having a pH of from about 7 to 11 and an alcohol solution;

at least one substituted amine in an amount effective to adjust the pH to about 8 to 11, said amine selected from the group consisting of $C_{1-6}$ alcohol amines, $C_{1-6}$ alkyl $C_{1-6}$ alcohol amines and mixtures thereof;

a binding effective amount of at least one water dispersible acrylic polymer;

an effective amount of at least one alkali soluble or alkali swellable thickener; and optionally includes one or more additives including dispersants, rheology modifiers, defoamers, coalescents and preservatives.

for use in painting a substrate and subsequent treatment with an alcohol solution.

In yet another aspect, there is disclosed herein use of an alcohol solution in treating an unworkable water-based acrylic artists' paint composition so as to form a workable water based composition, wherein the water-based acrylic artists' paint composition comprises:

at least one pigment in an effective amount to provide the desired pigmentation;

at least one alkali and alcohol soluble polymer (AASP) in an amount effective to increase the open time of the composition, said polymer being selected from the group consisting of polymers soluble at ambient temperature and pressure in an aqueous solution having a pH of from about 7 to 11 and an alcohol solution;

at least one substituted amine in an amount effective to adjust the pH to about 8 to 11, said amine selected from the group consisting of $C_{1-6}$ alcohol amines, $C_{1-6}$ alkyl $C_{1-6}$ alcohol amines and mixtures thereof;

a binding effective amount of at least one water dispersible acrylic polymer;

an effective amount of at least one alkali soluble or alkali swellable thickener; and optionally includes one or more additives including dispersants, rheology modifiers, defoamers, coalescents and preservatives.

The "open time" of the re-opened, wet, workable paint composition may be extended for several hours and for as long as a day by using the workable composition obtained by the method disclosed herein and by periodically applying the alcohol solution and one or more of a)-c) to the paint film for example by spraying or by transferral, for example, by way of a brush or by addition of the solution/medium to the fresh paint being applied. For example, through the addition of water soluble polymer the conventional acrylic binder, namely a water dispersible acrylic polymer, is prevented from forming a skin as the water evaporates. It will be understood that the term "periodically" will hold the meaning as hereinbefore defined.

In one embodiment the alcohol solution and a)-c) are in the form of a medium.

The medium comprising at least one alkali alcohol soluble polymer and at least one substituted amine selected from the group consisting of $C_{1-6}$ alcohol amines, $C_{1-6}$ alkyl $C_{1-6}$ alcohol amines and mixtures thereof in an amount effective to adjust the pH to about 8 to about 11 may be in the form of the paint composition itself. Accordingly, in one embodiment, the open time can be controlled by adding the alcohol solution and more of the paint composition disclosed herein.

It will be understood that the methods disclosed herein will typically be carried out by artists. Accordingly, the compositions will normally be prepared and used under studio conditions and outdoors to prepare artworks on conventional substrates using conventional palettes and brushes. Conventional substrates include but are not limited to canvas, masonite, wood based board, plastics, metal and paper.

Throughout the specification, reference to the "paint composition" disclosed herein refers to the water based, acrylic artists paint composition comprising AASP and substituted amine selected from the group consisting of $C_{1-6}$ alcohol amines, $C_{1-6}$ alkyl $C_{1-6}$ alcohol amines and mixtures thereof.

In the methods disclosed herein, the water-based acrylic artists' paint composition, comprising AASP and substituted amine, to be "re-opened" or "re-wet", is contacted with the alcohol solution. Contact can be achieved by dipping the paint brush into an alcohol solution and applying the brush to the dry paint composition to be re-opened; spraying the alcohol solution directly onto the paint composition on the substrate; or by spraying or adding the aqueous alcohol solution to the paint composition on the palette.

Throughout the specification, the term "open time" as used herein means the time during which the paint composition remains in a workable, wet state such that it is fluid and may be blended and altered.

Throughout the specification the terms "re-open" or "re-access" when used in relation to the open time of the paint composition refers to the process of changing the state of the paint composition from an unworkable state (i.e one that cannot be blended or altered) to a workable state. It makes available, again, the wet state of the paint composition that can be altered and blended, i.e. the "open time" is re-accessed or re-opened. Throughout the specification "re-access" and "re-open" may be used interchangeably. It will be understood that a similar meaning is applicable to the terms "re-opening" and "re-accessing".

Throughout the specification the term "wet" or "wet state" refers to the physical state of the paint composition when the "open time" is available. It will be understood that when the composition is in the wet state, the paint is workable and fluid enabling it to be altered and blended. The term "rewet" may be used to describe the process of changing the paint composition from an unworkable state to a workable state. In one embodiment, a dry unworkable paint composition can be rewet to a wet workable paint composition.

Throughout the specification the term "workable" refers to the physical state of the paint composition and indicates that the paint composition is in a state in which the "open time" is available, wherein the paint composition is fluid and able to be altered and blended.

Throughout the specification the term "unworkable" refers to the physical state of the paint composition and indicates that the paint composition is in a state in which the "open time" is not available. The paint composition is not fluid and cannot be altered or blended. Accordingly, in one embodiment, the paint composition of the present disclosure will be in an unworkable state when the paint composition appears dry, such that it cannot be altered or blended.

Throughout the specification the term "fluid" will be understood to mean a state in which the paint composition resembles fresh paint squeezed from commercially available paint in a tube, such that the paint composition continually deforms or flows freely under an applied force. It will be understood that the component particles of the paint composition move freely past one another.

Throughout the specification the term "wet in wet" will be understood to refer to painting techniques by which the artist creatively works and develops the wet paint on the substrate, adds further wet paint being the same paint or different paint, blends and alters the appearance of the wet paints over time to achieve the desired artistic result.

Throughout the specification the term "conventional artists paint composition" refers to acrylic paint compositions that do not contain alkali or alcohol soluble polymers (AASP) and at least one substituted amine selected from the group consisting of $C_{1-6}$ alcohol amines, $C_{1-6}$ alkyl $C_{1-6}$ alcohol amines and mixtures thereof in an amount effective to adjust the pH to about 8 to about 11.

The term "air-dried" as used herein means that the composition will dry or cure upon exposure to air. It will be understood that "cure" as used herein means that the amine has evaporated without cross-linking taking place. In one embodiment, "air dried" comprises drying or curing upon exposure to air at ambient temperature and pressure. Air dried compositions do not include thermoset or thermo-cured compositions.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The term "consisting essentially of" as used herein is intended to exclude elements that would materially affect the properties of the claimed composition or steps of the claimed method.

Alkali and Alcohol Soluble Polymer

As used herein, the term "alkali and alcohol soluble polymer (AASP)" means a polymer which is capable of being solubilised at ambient temperature and pressure in i) an aqueous solution where the pH is alkaline and ii) an alcohol solution. The solubilisation pH of the alkali and alcohol soluble polymer is generally in the order of from about 7 to about 11. Preferably the solubilisation pH is in the order of from about 8 to about 10, more preferably about 8 to about 9.5. An alkali and alcohol soluble polymer has at least one acidic or anion producing group. Examples of anion producing groups include but are not limited to carboxylic hydroxyl, phenolic hydroxyl, active imido and sulfonamide.

The alkali and alcohol soluble polymer is made to serve as an auxiliary binder and is not a conventional ingredient in acrylic artists paint compositions.

The proportion of alkali and alcohol soluble polymer can be varied to manipulate the drying time of the paint composition. In the presence of a slow-evaporating amine, the higher the ratio of alkali and alcohol soluble polymer (AASP) to water dispersible acrylic polymer (WDAP), the longer the drying time. In the presence of a fast-evaporating amine, the drying process is faster but the alcohol is still able to rewet the recently dried paint.

For a paint composition with a feel similar to a conventional acrylic artists' paint the ratio of alkali and alcohol soluble polymer to water dispersible acrylic polymer may range from about 1:8 to 1:8.

Commercially available AASP's (e.g. Acrysol I 62) are generally supplied as a 50% aqueous dispersion. When the AASP is present as a 50% dispersion, it may be referred to as being in a "wet" state. When the AASP is not in a dispersion, it may be referred to as being in a "dry" state. In a 200 L batch of paint for example where 80 kg/200 L of water dispersible acrylic binder is used and about 10 kg/200 L of alkali soluble or alkali swellable thickener, the amount of wet alkali soluble polymer may be in the range of about 4-20 kg/200 L, preferably 6-15 kg/200 L, more preferably 8-12 kg/200 L and most preferably 8-10 kg/200 L (this is equivalent to dry AASP in an amount of about 2-10 kg/200 L, preferably 4-7.5 kg/200 L, more preferably 4-6 kg/200 L and most preferably 4-5 kg/200 L). This equates to ratios of wet alkali soluble polymer to water dispersible acrylic polymer of from about 1:4 to 1:20, preferably from about 1:5.33 to 1:10, more preferably from about 1:6.66 to 1:10 and most preferably from about 1:8 to 1:10.

For a paint composition with a feel more like a traditional gouache a ratio of wet alkali soluble polymer to water dispersible acrylic polymer may range from about 1:1 to 1:3, preferably about 3:4. This ratio gives a tough paint film which is less brittle and more flexibile than a conventional guache but can still be applied thickly if desired.

Artists may wish to use paints in several different ways or techniques in the same painting and the paint is usually applied in successive layers. An artist may sometimes want a layer of paint to dry quickly, but more often wants to extend the open time, and being able to control what is happening is desirable.

A paint as described above with 80 kg water dispersible acrylic binder per 200 L and 8-12 kg of wet alkali soluble binder does not form a skin and can be kept "open" by spraying with water and further extended according to the present disclosure with an aqueous alcohol solution from time to time as water evaporates and the paint becomes tacky. Mediums can also be used to give the artists even more control.

For faster drying, a medium made from water dispersible acrylic polymer applied to a paint film will swing the balance towards fast film formation, while for a slower drying paint, a medium made from alkali soluble polymer/ substituted amine swings the balance in the opposite direction.

Suitable commercially available alkali and alcohol soluble polymers are flexographic ink polymers such as those manufactured by Rohm & Haas under the names Lucidene™ 361 and Lucidene™ 602 LS, and Acrysol I-62. Also suitable are Glascol™ LS16, and the LE 500 series-LE 510, LE 520 and LE 530 manufactured by Ciba Specialty Chemicals and Joncryl 142™ manufactured by Johnson Wax Co. In one embodiment, the alkali soluble polymer is Acrysol I-62.

Advantageously, in the method disclosed herein, the alcohol solution acts only on the solution polymer (ASSP) to reactive the water phase smoothly, without affecting the dispersion polymer (dispersible acrylic polymer) which is the main binder in the paint.

Substituted Amine

Substituted amines are included in amounts sufficient to adjust the paint composition to a pH in the range of about 8 to about 11. Preferably the pH is in the range of from 8 to 10, more preferably about 8 to 9.5.

Amines that may be used in the compositions of the invention extend from fast drying to slow drying amines. Slow drying amines facilitate in providing a paint composition in which the drying process is delayed. A fast drying amine may be used to let the paint dry quicker because when the amine evaporates the paint will be dry and will behave like a conventional paint however the open time of the paint composition can be easily re-opened by contact of the composition with alcohol. The use of a faster drying amine may be advantageous in shortening the curing time of the paint as it dries as it is while the paint is in a partly cured and rather sensitive state that artists come to grief with it.

Suitable slow drying amines include $C_{1-6}$ alcohol amines and $C_{1-6}$ alkyl $C_{1-6}$ alcohol amines such as aminomethyl-propanol (AMP), monoethanolamine (MEA), diethanolamine (DEA) and triethanolamine (TEA) and mixtures thereof. AMP and TEA and mixtures thereof are preferred. Substituted amines may be selected so as to slow the evaporation of the amines thereby extending the time in which the binders and thickeners (those which are water soluble or swellable under alkali conditions) may remain in solution.

Alcohol Solution

The method of the present invention requires the use of an alcohol solution. The alcohol solution used in the method disclosed herein is able to dissolve the alkali and alcohol soluble polymer (ASSP) but not the dispersible acrylic polymer. Examples of alcohols that may be used in the present invention include but are not limited to methanol, ethanol, propanol, isopropyl alcohol (IPA), butanol; butyl icinol and methylated spirits. The alcohol solution may comprise one or more alcohols. In one embodiment, non-toxic alcohol solutions are used. In one embodiment the alcohol solution comprises an alcohol selected from the group consisting of ethanol, propanol, isopropyl alcohol (IPA) and butanol. In another embodiment the alcohol is selected from isopropyl alcohol and/or ethanol. The alcohol solution may be used neat or as an aqueous solution. In one embodiment, the alcohol solution containing 50% or more of alcohol with water. In another embodiment, the alcohol solution is an aqueous solution of isopropyl alcohol 50% and water 50%. In another embodiment, the alcohol solution is an aqueous solution of ethanol 50% and water 50%.

The amount of alcohol solution required to re-open the dried paint composition will depend on how long the paint composition has been dry and how much amine and water has evaporated. Generally, the longer the paint composition has been in a dry unworkable state means that the substituted amine has been evaporating from the composition for a longer period of time. This results in the rewetting process taking longer with more alcohol solution being required to rewet the dry paint composition. As a comparison, under the same conditions, a paint composition that has been dry for a shorter period of time has more amine remaining. As noted earlier, the inventors believe the amine assists in re-solubilising the AASP and accordingly, with more amine present, it is easier to re-solubilise the AASP and therefore rewet the dry paint composition. Without being bound by theory, the inventor believes that the alcohol solution reactivates or reconstitutes the paint composition.

Accordingly, the amount of alcohol solution required to rewet the composition may be assessed visually by observing the consistency of the paint composition. Under similar conditions, it should be expected that more alcohol solution will be required to re-wet a paint composition that has been dry for a shorter period of time than for a paint that has been dry for a longer period of time.

The inventor believes that the alcohol and in some cases water dissolves the AASP to return the dry paint to a workable state where the aqueous phase carries the pigment and dispersion polymer in a wet state.

It will be appreciated that an artist using the methods disclosed herein would have the required knowledge to identify when enough alcohol solution has been contacted with the paint composition to allow it to change to a workable state. Essentially, enough alcohol solution has been applied when the paint composition is fluid such that it can be moved, blended and/or altered with the movement of the brush or other implement.

In one embodiment, the artist can apply the alcohol solution to a paint composition that has been applied to and dried on a substrate, such as a canvas, by way of dipping a paint brush into the alcohol solution and applying it to the paint composition on the canvas. In one embodiment the artist may repeat the dipping and applying process to the same or different sections of the substrate. In another embodiment, the alcohol solution is sprayed onto the paint composition on the canvas.

Dispersible Acrylic Polymer

The paint composition used in the method of the present invention includes at least one water dispersible acrylic polymer. These polymers are conventional binders for acrylic paints, well known to those skilled in the art. Suitable polymers include water dispersible polymers containing one or more monomers selected from styrene, acrylates, alkylarylates and dienes. Polymers including acrylate, methacrylate and methyl methacrylate monomers are common.

The selection of water dipersible acrylic binder and the quantity to be used for the composition of the present invention is within the skill of the person skilled in the art using routine trial and experimentation.

Examples of suitable commercially available water dispersible acrylic polymers are PR 3230, ac 2235, ACI-1955 and Primal SF-017 manufactured by Rohm & Haas. Also suitable is Acronal 290D manufactured by BASF.

The water dispersible acrylic polymer is present in the composition of the invention in a binding effective amount. A "binding effective amount" of at least one water dispersible acrylic polymer will be understood to mean that the at least one water dispersible polymer is present in an amount so that in combination with the at least one alkali polymer discussed above, it will bind the pigment particles together into a cohesive paint film upon drying.

Thickener

One or more alkali soluble thickeners or alkali swellable thickeners are included in the composition of the present invention. Such thickeners typically comprise the aqueous emulsion reaction product of an unsaturated carboxylic acid monomer, e.g., methacrylic acid; a monoethylenically unsaturated monomer different from the carboxylic acid monomer, e.g. ethyl acrylate; a macromonomer comprising a hydrophobic portion and an alkoxylated portion which is polymerizable with the other monomers; and a monomer having latent crosslinking functionality. Suitable thickeners include UCAR 146 and UCAR Polyphobe TR115, manufactured by Union Carbide and Acrysol DR-1, Acrysol DR-73, Acrysol ASE 60 manufactured by Rohm & Haas.

The thickeners may be varied depending on the main pigments being used in order to get a uniform viscosity. The selection of alkali soluble or alkali swellable thickener and the quantity to be used for the composition of the present invention is within the skill of the person skilled in the art using routine trial and experimentation.

Pigment

One or more pigments may be included in the composition. Pigmentation provides colour and opacity and may contribute to other properties of the paint composition. A person skilled in the art will be aware that pigment particle size and shape, ease of wettability or properties relating to specific density contribute to the viscosity and application characteristics of the wet paint composition and ultimately properties of the dried paint coatings. A person skilled in the art will therefore appreciate that the choice of pigment will have an effect on the choice of other ingredients such as thickeners.

It is well within the skill of the addressee to determine the appropriate selection of pigment and the quantity to be used using routine trial and experimentation.

Colour pigments may be organic or inorganic compounds, natural or synthetic and these may be used separately or in combination. Titanium dioxide is a common white pigment with a high refractive index and excellent hiding power (the ability to render a paint opaque). It is frequently used with both coloured organic and inorganic pigments. Iron oxides range in colour from yellow and red to brown and black. Azo pigments are a common class of organic colour pigments. Pigments called "extender" pigments may be used in conjunction with other pigments. The use of extender pigments reduces shrinkage stresses within the paint film and increases the pigment volume content at relatively low cost. Extender pigments include those based on carbonates, silicates, sulfates, barytes and mica. The use of extender pigments aids in viscosity and flow control and reinforces the dry film strength.

Dispersant

The composition of the present invention may include one or more dispersants. These are conventional ingredients used to enhance pigment loading and dispersion stability. The dispersant may be nonionic or anionic surfactants. Anionic surfactants are preferred. Examples of suitable anionic emulsifiers include sodium lauryl sulfate, sodium dodecyl benzene sulfonate, dioctylsulfosuccinate, sodium polyoxyethylene lauryl ether sulfate, sodium dodecyl diphenyloxide disulfonate and other diphenylsulfonate derivatives, and sodium salt of tert-octylphenoxyethoxypoly(39) ethoxyethyl sulfate.

Suitable anionic surfactants are manufactured by Rohm & Haas under the trade marks Orotan 1124, Orotan 1288, Orotan 731 DP and Orotan 850.

The skilled addressee is able to determine the appropriate selection of dispersants and the quantity to be used using routine trial and experimentation.

Other Additives

The composition also optionally includes one or more conventional additives such as rheology modifiers, defoamers, coalescents and preservatives.

SPECIFIC EMBODIMENTS

Disclosed below are specific embodiments of the present disclosure in the form of items 1-36:

1. A method of re-accessing the open time of an unworkable artists' paint composition, wherein the paint composition comprises:

i) at least one alkali and alcohol soluble polymer (AASP) said polymer being selected from the group consisting of polymers soluble at ambient temperature and pressure in an aqueous solution having a pH of from about 7 to about 11 and an alcohol;

ii) at least one substituted amine in an amount effective to adjust the pH to about 8 to about 11, said amine selected from the group consisting of $C_{1-6}$ alcohol amines, $C_{1-6}$ alkyl $C_{1-6}$ alcohol amines and mixtures thereof;

iii) a binding effective amount of at least one water dispersible acrylic polymer; and the method comprising contacting the unworkable paint composition with an alcohol solution in an amount effective to re-access the open time of the unworkable paint composition and form a workable paint composition.

2. A method of re-wetting an artists' paint composition which is in an unworkable state, wherein the paint composition comprises:

i) at least one alkali and alcohol soluble polymer (AASP) in an amount effective to increase the open time of the composition, said polymer being selected from the group consisting of polymers soluble at ambient temperature and pressure in an aqueous solution having a pH of from about 7 to about 11 and an alcohol;

ii) at least one substituted amine in an amount effective to adjust the pH to about 8 to about 11, said amine selected from the group consisting of $C_{1-6}$ alcohol amines, $C_{1-6}$ alkyl $C_{1-6}$ alcohol amines and mixtures thereof;

iii) a binding effective amount of at least one water dispersible acrylic polymer; and the method comprising contacting the artists' paint composition with an alcohol solution in an amount sufficient to wet the artists' paint composition so that it is in a workable state.

3. A workable paint composition obtained by the method of item 1 or 2.

4. A method of painting a substrate comprising:
applying to the substrate a workable paint composition
allowing the paint composition to dry to an unworkable state; and
contacting the artists' paint composition with an alcohol solution in an amount sufficient to wet the artists' paint composition so that it is in a workable state,
wherein the paint composition comprises
i) at least one alkali and alcohol soluble polymer (AASP) in an amount effective to increase the open time of the composition, said polymer being selected from the group consisting of polymers soluble at ambient temperature and pressure in an aqueous solution having a pH of from about 7 to about 11 and an alcohol
ii) at least one substituted amine in an amount effective to adjust the pH to about 8 to about 11, said amine selected from the group consisting of $C_{1-6}$ alcohol amines, $C_{1-6}$ alkyl $C_{1-6}$ alcohol amines and mixtures thereof;
iii) a binding effective amount of at least one water dispersible acrylic polymer.

5. A method of controlling the open time of a workable water-based acrylic artists' paint composition comprising at least one alkali and alcohol soluble polymer (AASP) and at least one substituted amine selected from the group consisting of $C_{1-6}$ alcohol amines, $C_{1-6}$ alkyl $C_{1-6}$ alcohol amines and mixtures thereof in an amount effective to adjust the pH to about 8 to about 11, the method comprising contacting the paint composition with an alcohol solution and optionally one or more of:
(a) water; and
(b) a medium comprising at least one alkali soluble polymer and at least one substituted amine selected from the group consisting of $C_{1-6}$ alcohol amines, $C_{1-6}$ alkyl $C_{1-6}$ alcohol amines and mixtures thereof in an amount effective to adjust the pH to about 8 to about 11; and
(c) a medium comprising at least one water dispersible acrylic polymer.

6. The method of item 5 wherein the workable water-based acrylic artists' paint composition is obtained by treating an unworkable water-based acrylic artists' paint composition with an alcohol solution.

7. The method of item 5 or 6 wherein the workable water-based acrylic artists' paint composition is obtained according to the method of claim 1 or 2.

8. The method of item 5 or 6 wherein contacting the paint composition with the alcohol solution and optionally one or more of a)-c) takes place periodically so as to provide a workable paint composition.

9. The method of any one of items 1, 2, or 4-8, wherein the water-based artists' paint composition comprises:
at least one pigment in an effective amount to provide the desired pigmentation;
at least one alkali and alcohol soluble polymer (AASP) in an amount effective to increase the open time of the composition, said polymer being selected from the group consisting of polymers soluble at ambient temperature and pressure in an aqueous solution having a pH of from about 7 to 11 and an alcohol solution;
at least one substituted amine in an amount effective to adjust the pH to about 8 to 11, said amine selected from the group consisting of $C_{1-6}$ alcohol amines, $C_{1-6}$ alkyl $C_{1-6}$ alcohol amines and mixtures thereof;
a binding effective amount of at least one water dispersible acrylic polymer;
an effective amount of at least one alkali soluble or alkali swellable thickener; and optionally includes one or more additives including dispersants, rheology modifiers, defoamers, coalescents and preservatives.

10. The method of item 9 wherein the at least one alkali soluble polymer is soluble at ambient temperature and pressure in an aqueous solution having a pH of from 7.5 to 9.5.

11. The method of item 9 wherein the at least one substituted amine is in an amount effective to adjust the pH to 8 to 9.5.

12. The method of item 9 wherein the at least one alkali soluble polymer is present in an amount in the range of 2-10 kg/200 L and wherein the weight ratio of alkali soluble polymer to water dispersible acrylic polymer is in the range from 1:4 to 1:20.

13. The method of item 9 wherein the weight ratio of alkali soluble polymer to water dispersible acrylic polymer is in the range of 1:1 to 1:3.

14. The method of item 9 wherein the at least one substituted amine is selected from the group consisting of aminomethylpropanol (AMP), monoethanolamine (MEA), diethanolamine (DEA) and triethanolamine (TEA) and mixtures thereof.

15. The method of any one of claim 1, 2 or 4-14 wherein the unworkable water-based acrylic artists' paint composition has been drying for less than 12 hours.

16. The method of item 9 wherein the alkali and alcohol soluble polymer is in an amount effective to control the open time of the paint composition.

17. The method of item 9 wherein the alkali and alcohol soluble polymer is in an amount effective to rewet a paint composition and/or extend the open time of the paint composition.

18. The method of any one of items 1, 2 or 4-17 wherein the unworkable water-based acrylic artists' paint composition has been drying for a period of within an hour up to 5 days or until the amine evaporates.

19. The method of any one of items 1, 2 or 4-17 wherein the unworkable water-based acrylic artists' paint composition has been drying for a period of within an about hour up to several days such as 3 days.

20. The method of any one of items 1, 2 or 4-17 wherein the unworkable water-based acrylic artists' paint composition has been drying for a period of within about an hour up to about 12 hours, or within about an hour up to about 6 hours.

21 A water-based acrylic artists' paint composition comprising:
at least one pigment in an effective amount to provide the desired pigmentation;
at least one alkali and alcohol soluble polymer (AASP) in an amount effective to increase the open time of the composition, said polymer being selected from the group consisting of polymers soluble at ambient temperature and pressure in an aqueous solution having a pH of from about 7 to 11 and an alcohol solution;
at least one substituted amine in an amount effective to adjust the pH to about 8 to 11, said amine selected from the group consisting of $C_{1-6}$ alcohol amines, $C_{1-6}$ alkyl $C_{1-6}$ alcohol amines and mixtures thereof;

a binding effective amount of at least one water dispersible acrylic polymer;

an effective amount of at least one alkali soluble or alkali swellable thickener;

and optionally includes one or more additives including dispersants, rheology modifiers, defoamers, coalescents and preservatives.

for use in painting a substrate and subsequent treatment with an alcohol solution.

22. The method of item 4 or the paint composition of item 21 wherein the substrate is selected from the group including canvas, Masonite, wood, plastic, metal and paper.

23. Use of an alcohol solution in treating an unworkable water-based acrylic artists' paint composition so as to form a workable water based composition, wherein the water-based acrylic artists' paint composition comprises:

at least one pigment in an effective amount to provide the desired pigmentation;

at least one alkali and alcohol soluble polymer (AASP) in an amount effective to increase the open time of the composition, said polymer being selected from the group consisting of polymers soluble at ambient temperature and pressure in an aqueous solution having a pH of from about 7 to 11 and an alcohol solution;

at least one substituted amine in an amount effective to adjust the pH to about 8 to 11, said amine selected from the group consisting of $C_{1-6}$ alcohol amines, $C_{1-6}$ alkyl $C_{1-6}$ alcohol amines and mixtures thereof;

a binding effective amount of at least one water dispersible acrylic polymer;

an effective amount of at least one alkali soluble or alkali swellable thickener; and optionally includes one or more additives including dispersants, rheology modifiers, defoamers, coalescents and preservatives.

24. The method of any one of items 1, 2, 4-20, or 22, the composition of any one of items 3 or 21, or the use of item 23 wherein the alcohol solution is an aqueous solution.

25. The method, composition or use of item 24 wherein the alcohol solution is an alcohol solution is selected form the group consisting of methanol, ethanol, propanol, isopropyl alcohol (IPA), butanol; butyl icinol and methylated spirits, 26. The method, composition or use of item 24 or 25 wherein the alcohol solution comprises an alcohol selected from the group consisting of, ethanol, propanol or isopropyl alcohol (IPA) or butanol.

27. The method, composition or use of item 24, 25 or 26 wherein the alcohol solution comprises an alcohol selected from the group consisting of ethanol or isopropyl alcohol (IPA).

28, The method, composition or use of any one of items 24-27 wherein the alcohol solution is an aqueous solution of isopropyl alcohol 50% and water 50%.

29. The method, composition or use of any one of items 24-27 wherein the alcohol solution is sprayed onto the paint composition.

30. The method, composition or use of any one of items 24-27 wherein the alcohol solution is contacted with the paint composition by dipping an implement, such as a paint brush, into the alcohol solution and applying it the paint composition.

31. The method of item 4 wherein the workable paint composition is further applied to the paint composition applied to the substrate.

32. The method of item 31 wherein the paint composition applied to the substrate is a workable and/or unworkable paint composition.

33. A method of painting a substrate comprising:

applying to the substrate a workable paint composition and contacting the artists' paint composition with an alcohol solution in an amount sufficient to wet the artists' paint composition so that it is in a workable state, wherein the paint composition comprises i) at least one alkali and alcohol soluble polymer (AASP) in an amount effective to increase the open time of the composition, said polymer being selected from the group consisting of polymers soluble at ambient temperature and pressure in an aqueous solution having a pH of from about 7 to about 11 and an alcohol:

ii) at least one substituted amine in an amount effective to adjust the pH to about 8 to about 11, said amine selected from the group consisting of $C_{1-6}$ alcohol amines, $C_{1-6}$ alkyl $C_{1-6}$ alcohol amines and mixtures thereof; and iii) a binding effective amount of at least one water dispersible acrylic polymer.

34. The method of item 33 wherein the paint composition is applied to the substrate and allowed to dry to a semi-wet state, such that the paint composition is transitioning from a wet to a dry state.

35. The method of item 33 wherein the paint composition is applied to the substrate and allowed to dry to an unworkable state.

36. The method of item 9 wherein the alkali and alcohol soluble polymer is Acrysol I-62.

EXAMPLES

The invention will now be further discussed with reference to the following examples. It is to be understood that these examples are illustrative and not restrictive.

The following compositions may be used in the methods of the present invention.

Example 1

| Ingredient | Function | Quantity (kg) |
|---|---|---|
| Quinacridone Magenta | Pigment | 16 kg |
| Orotan 1124 (Rohm & Haas) Functionalised polyacrylate copolymer (Anionic Dispersant) | Dispersant | 4 kg |
| Surfynol CT-171 (Air Products & Chemicals Inc) Anionic Dispersant | Dispersant | 4 kg |
| Acrysol I 62 (Rohm & Haas) (50% AASP dispersion) Alkali Soluble Ink Polymer | Auxiliary Binder | 10 kg (eqiliv. to 5 kg dry AASP) |
| Calcium Carbonate | Extender | 50 kg |
| PR3230 (Rohm & Haas) Acrylic Dispersion | Binder | 80 kg |
| Propylene Glycol | Freeze/thaw stability | 6 kg |
| TT615 (Rohm & Haas) Alkali Swellable Rheology Modifier | Rheology Modifier | 2 kg |
| Acrysol DR1 (Rohm & Haas) Alkali Swellable Rheology Modifier | Rheology Modifier | 2 kg |
| Acrysol ASE 60 (Rohm & Haas) Acrylic polymer | Thickener | 8-10 kg |

-continued

| Ingredient | Function | Quantity (kg) |
|---|---|---|
| containing carboxylic acid groups (Alkali Swellable Thickener) | | |
| AMP or MEA to pH 9.3 | Neutraliser | |
| Water | | q.s. 200 L |

Example 2

| Ingredient | Function | Quantity (kg) |
|---|---|---|
| Perinone Orange | Pigment | 10 kg |
| Remainder as for Example 1 except no Quinacridone Magenta pigment | | |

Example 3

| | | | |
|---|---|---|---|
| 3. Terre Verte | Pthalo Blue Pigment: | | 4 kg |
| | Raw Sienna Pigment: | | 68.25 kg |
| | Remainder as for Example 1 except no Quinacridone Magenta pigment or calcium carbonate | | |

Example 4

| | | | |
|---|---|---|---|
| 4. Blue Black | Pthalo Blue | | 10 kg |
| | Carbon Black | | 2.5 kg |
| | Remainder as per Example 1 except no Quinacridone Magenta pigment | | |

Example 5

| | | | |
|---|---|---|---|
| 5. Ultramarine Blue | Pigment | | 80 kg |
| | Remainder as for Example 1 except no Quinacridone Magenta pigment or calcium carbonate | | |

The thickeners may be varied depending on the main pigments being used in order to get a uniform viscosity. The alkali swellable thickener in the examples may be substituted with other conventional alkali swellable thickeners as discussed above.

The amount of alkali and alcohol soluble polymer may be varied to control the rate of drying. In the above examples, Acrysol I-62 may be varied from about 6 kg to about 15 kg/200 L (dry 3-7.5 kg/200 L). Preferred amounts are from 8-15 kg/200 L (4-7.5 kg/220 L dry AASP) more preferably 8-12 kg/200 L (4-6 kg/200 L dry AASP).

The paint making process is the same for any colour and is the conventional procedure which may be summarised as follows:

Stage 1: Load: Add water, dispersants, some defoamer as required to control against foam and alkali soluble ink polymer and under agitation using a cavitation mixer such as a TORRACE mixer, add enough substituted amine, such as MEA or TEA, to neutralize this mixture to desired pH, add the coalescent if used. A suitable defoamer is manufactured by Henkel under the trade mark Foamaster NS-1.

Stage 2: At this point the pigment (and extender if used) is added, either in powder form, or possibly as a pre-dispersed liquid which has already been processed in a bead mill.

Stage 3: Add a portion of the thickener and disperse.

Stage 4: Let down: Add the acrylic binder dispersion, the rheology modifiers and remainder of the thickener and the propylene glycol.

Stage 5: Add sufficient water to make 200 L and stir until the batch is uniform.

Example 6

| Ingredient | Function | Quantity (kg) |
|---|---|---|
| Quinacridone Magenta Pigment | Pigment | 16 kg |
| Calcium Carbonate | Extender | 50 kg |
| Orotan 1124 (Rohm & Haas) Functionalised polyacrylate copolymer (Anionic Dispersant) | Dispersant | 4 kg |
| Surfynol CT-171 (Air Products & Chemicals Inc),. Anionic Dispersant | Dispersant | 4 kg |
| AC 2235 (Rohm & Haas] Acrylic Dispersion | Binder | 80 kg |
| Texanol (Eastman Chemical Company) Ester alcohol | Coalescent | 2 kg |
| TT615 (Rohm & Haas) Alkali Swellable Rheology Modifier | Rheology Modifier | 1.5 kg |
| Acrysol ASE 60 (Rohm & Haas) Acrylic polymer containing carboxylic acid groups (Alkali Swellable Thickener) | Thickener | 10 kg |
| Acrysol DR72 (Rohm & Haas) Alkali Swellable Rheology Modifier | Rheology Modifier | 2 kg |
| Propylene Glycol | Freeze/thaw stabilizer | 4 kg |
| Alkali Soluble Ink Polymer (50% AASP dispersion) | Auxiliary Binder | 10 kg (equiv. to 5 kg dry AASP) |
| AMP or ME A to pH 9.3 | Neutraliser | |
| Water | | q.s. 200 L |

Example 7

| Ingredient | Function | Quantity (kg) |
|---|---|---|
| Arylamide Yellow Pigment 2G X 70 | Pigment | 20 kg |
| Orotan 1124 (Rohm & Haas) Functionalised polyacrylate copolymer (Anionic Dispersant) | Dispersant | 4 kg |
| Surfynol CT-171 (Air Products & Chemicals Inc). Anionic Dispersant | Dispersant | 4 kg |
| AC I-1955 (Rohm & Haas) Alkali Soluble Acrylic Dispersion | Binder | 80 kg |

-continued

| Ingredient | Function | Quantity (kg) |
|---|---|---|
| Texanol (Eastman Chemical Co) Ester alcohol | Coalescent | 2 kg |
| TT615 (Rohm & Haas) Alkali Swellable Rheology Modifier | Rheology Modifier | 2 kg |
| Acrysol ASE 60 (Rohm & Haas) Acrylic polymer containing carboxylic acid groups (Alkali Swellable Thickener) | Thickener | 10 kg |
| Lucidene 361 (Rohm & Haas) water-based polystyrene/acrylic emulsion (Alkali Soluble Ink Polymer) (50% dispersion) | Auxiliary Binder AASP | 10 kg (equiv. to 5 kg dry AASP) |
| AMP or MEA to pH 9.3 | Neutraliser | |
| Water | | q.s. 200 L |

Example 8

| Ingredient | Function | Quantity (kg) |
|---|---|---|
| Pthalo Green Pigment | Pigment | 20 kg |
| Calcium Carbonate | Extender | 50 kg |
| Orotan 1124 (Rohm & Haas) Functionalised polyacrylate copolymer (Anionic Dispersant) | Dispersant | 4 kg |
| Surfynol CT-171 (Air Products & Chemicals Inc) Anionic Dispersant | Dispersant | 4 kg |
| Acronal 290D (BASF) Styrene/acrylic copolymer dispersion | Binder | 80 kg |
| Texanol (Eastman Chemical Co) Ester alcohol | Coalescent | 2 kg |
| Acrysol DR72 (Rohm & Haas) Alkali Swellable Rheology Modifier | Rheology Modifier | 2 kg |
| Acrysol ASE 60 (Rohm & Haas) Acrylic polymer containing carboxylic acid groups (Alkali Swellable Thickener) | Thickener | 10 kg |
| Polyphobe TR117 (Union Carbide) | Thickener | 1 kg |
| Joncryl 142 (Johnson Wax Co) Alkali Soluble Ink Polymer (50% dispersion) | Auxiliary Binder AASP | 10 kg (equiv. to 5 kg dry AASP) |
| AMP or MEA to pH 9.3 | Neutraliser | |
| Water | | q.s. 200 L |

Key to Examples 9-31

| Ingredient | Manufacturer | Quantity (kg) |
|---|---|---|
| Surfynol CT-171 (anionic dispersant) | Air Products & Chemicals Inc | Dispersant |
| Orotan 1124 (anionic dispersant) | Rohm & Haas | Dispersant |
| Mergal K10N | Troy Corporation | Biocide |
| Polyphase AF3 | Troy Corporation | Fungicide |
| Foamaster NS-1 | Henkel | Defoamer |
| Propylene glycol | Shell Petroleum | Freeze/thaw stability |
| AMP-95 | Dow Chemicals | Neutraliser |
| Primal SF-017 Water dispersible acrylic polymer | Rohm & Haas | Binder |
| Acrysol TT-615 (alkali swellable rheology modifier) | Rohm & Haas | Rheology modifier |
| Acrysol DR-1 (alkali swellable rheology modifier) | Rohm & Haas | Rheology modifier |
| Viscalex HV-30 | Ciba Specialty Chemicals | Thickener |
| Acrysol I-62 (alkali soluble polymer) 50% dipsersion | Rohm & Haas | Auxiliary binder - AASP |
| Omycarb-2 (calcium carbonate) | Omya-Southern Chemicals | Extender |
| Envirogen AD Surfactant | Air Products & Chemicals Inc | Non-foaming wetting agent |

Example 9

| Ingredient | Quantity (kg) |
|---|---|
| Surfynol CT-171 | 1 |
| Orotan 1124 | 1.5 |
| Propylene Glycol | 6 |
| Mergal K10N | 0.3 |
| Polyphase AF3 | 0.3 |
| Foamaster NS-1 | 0.5 |
| AMP-95 | 4 |
| Primal SF-017 | 85 |
| Acrysol TT-615 | 1 |
| Acrysol DR-1 | 1 |
| Viscalex HV-30 | 8 |
| Acrysol I-62 (50% AASP dispersion) | 10 (dry AASP = 5) |
| Pigment: Merlin Super Copper | 50 |
| Water | q.s. 200 L |

Example 10

| Ingredient | Quantity (kg) |
|---|---|
| Surfynol CT-171 | 2 |
| Orotan 1124 | 3 |
| Propylene Glycol | 6 |
| Mergal K10N | 0.3 |
| Polyphase AF3 | 0.3 |
| Foamaster NS-1 | 0.5 |
| AMP-95 | 5 |
| Primal SF-017 | 85 |
| Acrysol TT-615 | 1 |
| Acrysol DR-1 | 1 |
| Viscalex HV-30 | 10 |
| Acrysol I-62 (50% AASP dispersion) | 10 (dry AASP = 5) |
| Pigment: Shepherd Green 260 | 100 |
| Water | q.s. 200 L |

Example 11

| Ingredient | Quantity (kg) |
| --- | --- |
| Surfynol CT-171 | 0.5 |
| Orotan 1124 | 1.5 |
| Propylene Glycol | 6 |
| Mergal K10N | 0.3 |
| Polyphase AF3 | 0.3 |
| Foamaster NS-1 | 0.5 |
| Omyacarb-2 | 50 |
| AMP-95 | 5 |
| Primal SF-017 | 85 |
| Acrysol TT-615 | 1 |
| Acrysol DR-1 | 1 |
| Viscalex HV-30 | 12 |
| Acrysol I-62 (50% AASP dispersion) | 10 (dry AASP = 5) |
| Pigment: Red 3705 | 50 |
| Water | q.s. 200 L |

Example 12

| Ingredient | Quantity (kg) |
| --- | --- |
| Surfynol CT-171 | 0.5 |
| Orotan 1124 | 1.5 |
| Propylene Glycol | 6 |
| Mergal K10N | 0.3 |
| Polyphase AF3 | 0.3 |
| Foamaster NS-1 | 0.5 |
| Omyacarb-2 | 50 |
| AMP-95 | 5 |
| Primal SF-017 | 85 |
| Acrysol TT-615 | 1 |
| Acrysol DR-1 | 1 |
| Viscalex HV-30 | 12 |
| Acrysol I-62 (50% AASP dispersion) | 10 (dry AASP = 5) |
| Pigment: Pink 304/80 | 17.5 |
| Pigment: Red HFT | 20 |
| Water | q.s. 200 L |

Example 13

| Ingredient | Quantity (kg) |
| --- | --- |
| Surfynol CT-171 | 0.5 |
| Orotan 1124 | 1.5 |
| Propylene Glycol | 6 |
| Mergal K10N | 0.3 |
| Polyphase AF3 | 0.3 |
| Foamaster NS-1 | 0.5 |
| Omyacarb-2 | 50 |
| AMP-95 | 5 |
| Primal SF-017 | 85 |
| Acrysol TT-615 | 1 |
| Acrysol DR-1 | 1 |
| Viscalex HV-30 | 12 |
| Acrysol I-62 (50% AASP dispersion) | 10 (dry AASP = 5) |
| Pigment: RCL 595 | 36 |
| Pigment: Pink 304/80 | 30 |
| Water | q.s. 200 L |

Example 14

| Ingredient | Quantity (kg) |
| --- | --- |
| Surfynol CT-171 | 0.5 |
| Orotan 1124 | 1.5 |
| Propylene Glycol | 6 |
| Mergal K10N | 0.3 |
| Polyphase AF3 | 0.3 |
| Foamaster NS-1 | 0.5 |
| Omyacarb-2 | 50 |
| AMP-95 | 4 |
| Primal SF-017 | 85 |
| Acrysol TT-615 | 1 |
| Acrysol DR-1 | 1 |
| Viscalex HV-30 | 8 |
| Acrysol I-62 (50% AASP dispersion) | 10 (dry AASP = 5) |
| Pigment: RCL 595 | 36 |
| Pigment: Violet C10 | 6.2 |
| Water | q.s. 200 L |

Example 15

| Ingredient | Quantity (kg) |
| --- | --- |
| Surfynol CT-171 | 0.5 |
| Orotan 1124 | 1.5 |
| Propylene Glycol | 6 |
| Mergal K10N | 0.3 |
| Polyphase AF3 | 0.3 |
| Foamaster NS-1 | 0.5 |
| Omyacarb-2 | 50 |
| AMP-95 | 5 |
| Primal SF-017 | 85 |
| Acrysol TT-615 | 1 |
| Acrysol DR-1 | 1 |
| Viscalex HV-30 | 11 |
| Acrysol I-62 (50% AASP dispersion) | 10 (dry AASP = 5) |
| Pigment: Red Fble | 60 |
| Water | q.s. 200 L |

Example 16

| Ingredient | Quantity (kg) |
| --- | --- |
| Surfynol CT-171 | 0.25 |
| Orotan 1124 | 0.75 |
| Propylene Glycol | 6 |
| Mergal K10N | 0.3 |
| Polyphase AF3 | 0.3 |
| Foamaster NS-1 | 0.5 |
| Omyacarb-2 | 50 |
| AMP-95 | 5 |
| Primal SF-017 | 85 |
| Acrysol TT-615 | 1 |
| Acrysol DR-1 | 1 |
| Viscalex HV-30 | 10 |
| Acrysol I-62 (50% AASP dispersion) | 10 (dry AASP = 5) |
| Pigment: RCL 595 | 60 |
| Pigment: Blue 2gax | 6.5 |
| Pigment: Green 1211/79 | 10.5 |
| Water | q.s. 200 L |

Example 17

| Ingredient | Quantity (kg) |
| --- | --- |
| Surfynol CT-171 | 0.5 |
| Orotan 1124 | 1.5 |
| Propylene Glycol | 6 |
| Mergal K10N | 0.3 |
| Polyphase AF3 | 0.3 |
| Foamaster NS-1 | 0.5 |
| Omyacarb-2 | 50 |
| AMP-95 | 5 |
| Primal SF-017 | 85 |
| Acrysol TT-615 | 1 |
| Acrysol DR-1 | 1 |
| Viscalex HV-30 | 10 |
| Acrysol I-62 (50% AASP dispersion) | 10 (dry AASP = 5) |
| Pigment: RCL 595 | 75 |
| Pigment: Yellow 1811/82 | 2 |
| Pigment: Yellow C16 | 10 |
| Water | q.s. 200 L |

Example 18

| Ingredient | Quantity (kg) |
| --- | --- |
| Surfynol CT-171 | 1.5 |
| Orotan 1124 | 2.25 |
| Propylene Glycol | 6 |
| Mergal K10N | 0.3 |
| Polyphase AF3 | 0.3 |
| Foamaster NS-1 | 0.5 |
| AMP-95 | 4 |
| Primal SF-017 | 85 |
| Acrysol TT-615 | 1 |
| Acrysol DR-1 | 1 |
| Viscalex HV-30 | 11 |
| Acrysol I-62 (50% AASP dispersion) | 10 (dry AASP = 5) |
| Pigment: Black Oxide 318 | 70 |
| Water | q.s. 200 L |

Example 19

| Ingredient | Quantity (kg) |
| --- | --- |
| Surfynol CT-171 | 0.25 |
| Orotan 1124 | 0.75 |
| Propylene Glycol | 6 |
| Mergal K10N | 0.3 |
| Polyphase AF3 | 0.3 |
| Foamaster NS-1 | 0.5 |
| Omyacarb-2 | 25 |
| AMP-95 | 4 |
| Primal SF-017 | 85 |
| Acrysol TT-615 | 1 |
| Acrysol DR-1 | 1 |
| Viscalex HV-30 | 8 |
| Acrysol I-62 (50% AASP dispersion) | 10 (dry AASP = 5) |
| Pigment: RCL 595 | 150 |
| Water | q.s. 200 L |

Example 20

| Ingredient | Quantity (kg) |
| --- | --- |
| Surfynol CT-171 | 1.5 |
| Orotan 1124 | 2.25 |
| Propylene Glycol | 6 |
| Mergal K10N | 0.3 |
| Polyphase AF3 | 0.3 |
| Foamaster NS-1 | 0.5 |
| amp-95 | 4.5 |
| Primal SF-017 | 85 |
| Acrysol TT-615 | 1 |
| Acrysol DR-1 | 1 |
| Viscalex HV-30 | 10 |
| Acrysol I-62 (50% AASP dispersion) | 10 (dry AASP = 5) |
| Pigment: RS 210 | 68 |
| Water | q.s. 200 L |

Examples 21-31 exemplify paint compositions that are more like a traditional gouache.

Example 21

| Absolute matte: ultramarine blue | |
| --- | --- |
| Ingredient | Quantity (kg) |
| Surfynol CT-171 | 5.5 |
| Orotan 1124 | 2.25 |
| Propylene glycol | 12 |
| Mergal K10N | 0.2 |
| Foamaster NS-1 | 0.5 |
| Envirogen ad surfactant | 0.2 |
| AMP-95 | 4 |
| Primal SF-017 | 40 |
| Acrysol TT-615 | 1 |
| Acrysol DR-1 | 1 |
| Viscalex HV-30 | 8 |
| Acrysol I-62 (50% AASP dispersion) | 10 (dry AASP = 5) |
| Pigment: ultra blue premier RX | 75 |
| Water | q.s. 200 L |

Example 22

| Absolute matte: napthol red light | |
| --- | --- |
| Ingredient | Quantity (kg) |
| Surfynol CT-171 | 4.4 |
| Orotan 1124 | 1.2 |
| Propylene glycol | 12 |
| Mergal K10N | 0.2 |
| Foamaster NS-1 | 0.5 |
| Envirogen AD surfactant | 0.2 |
| Omyacarb 2 | 60 |
| AMP-95 | 4 |
| Primal SF-017 | 40 |
| Acrysol TT-615 | 1 |
| Acrysol DR-1 | 1 |
| Viscalex HV-30 | 6 |
| Acrysol I-62 (50% AASP dispersion) | 10 (dry AASP = 5) |
| Pigment: red frll | 50 |
| Water | q.s. 200 L |

Example 23

| Absolute matte: cobalt turquoise light | |
|---|---|
| Ingredient | Quantity (kg) |
| Surfynol CT-171 | 6 |
| Orotan 1124 | 3 |
| Propylene glycol | 12 |
| Mergal K10N | 0.2 |
| Foamaster NS-1 | 0.5 |
| Envirogen AD surfactant | 0.2 |
| AMP-95 | 4 |
| Primal SF-017 | 40 |
| Acrysol TT-615 | 1 |
| Acrysol DR-1 | 1 |
| Viscalex HV-30 | 8 |
| Acrysol I-62 (50% AASP dispersion) | 9 (dry AASP = 4.5) |
| Pigment:irgacolor turquoise 22-5500p | 100 |
| Water | q.s. 200 L |

Example 24

| Absolute matte: titanium white | |
|---|---|
| Ingredient | Quantity (kg) |
| Surfynol CT-171 | 4.4 |
| Orotan 1124 | 1.2 |
| Propylene glycol | 12 |
| Mergal K10N | 0.2 |
| Foamaster NS-1 | 0.5 |
| Envirogen AD surfactant | 0.2 |
| Omyacarb 2 | 60 |
| AMP-95 | 4 |
| Primal SF-017 | 40 |
| Acrysol TT-615 | 1 |
| Acrysol ACRYSOL DR-1 | 1 |
| Viscalex HV-30 | 8 |
| Acrysol I-62 (50% AASP dispersion) | 10 (dry AASP = 5) |
| Pigment: RCL 595 | 150 |
| Water | q.s. 200 L |

Example 25

| Absolute matte: chromium green oxide | |
|---|---|
| Ingredient | Quantity (kg) |
| Surfynol CT-171 | 5.8 |
| Orotan 1124 | 3.6 |
| Propylene glycol | 12 |
| Mergal K10N | 0.2 |
| Foamaster NS-1 | 0.5 |
| Envirogen AD surfactant | 0.2 |
| Omyacarb 2 | 40 |
| AMP-95 | 4 |
| Primal SF-017 | 40 |
| Acrysol TT-615 | 1 |
| Acrysol ACRYSOL DR-1 | 1 |
| Viscalex HV-30 | 8 |
| Acrysol I-62 (50% AASP dispersion) | 10 (dry AASP = 5) |
| Pigment: green oxide g6099 | 80 |
| Water | q.s. 200 L |

Example 26

| Absolute matte: pthalo blue (red shade) | |
|---|---|
| Ingredient | Quantity (kg) |
| Surfynol CT-171 | 4.5 |
| Orotan 1124 | 1.2 |
| Propylene glycol | 12 |
| Mergal K10N | 0.2 |
| Foamaster NS-1 | 0.5 |
| Envirogen AD surfactant | 0.2 |
| Omyacarb 2 | 70 |
| AMP-95 | 4 |
| Primal SF-017 | 45 |
| Acrysol TT-615 | 1 |
| Acrysol DR-1 | 1 |
| Viscalex HAV-30 | 6 |
| Acrysol I-62 (50% AASP dispersion) | 10 (dry AASP = 5) |
| Pigment: blue 303/81 | 30 |
| Water | q.s. 200 L |

Example 27

| Absolute matte: pthalo green | |
|---|---|
| Ingredient | Quantity (kg) |
| Surfynol CT-171 | 4.5 |
| Orotan 1124 | 1.5 |
| Propylene glycol | 12 |
| Mergal K10N | 0.2 |
| Foamaster NS-1 | 0.5 |
| Envirogen AD surfactant | 0.2 |
| Omyacarb 2 | 70 |
| AMP-95 | 4 |
| Primal SF-017 | 40 |
| Acrysol TT-615 | 1 |
| Acrysol DR-1 | 1 |
| Viscalex HV-30 | 6 |
| Acrysol I-62 (50% AASP dispersion) | 10 (dry AASP = 5) |
| Pigment: green 1211/79 | 30 |
| Water | q.s. 200 L |

Example 28

| Absolute matte: burnt umber | |
|---|---|
| Ingredient | Quantity (kg) |
| Surfynol CT-171 | 5.6 |
| Orotan 1124 | 2.4 |
| Propylene glycol | 12 |
| Mergal K10N | 0.2 |
| Foamaster NS-1 | 0.5 |
| Envirogen AD surfactant | 0.2 |
| AMP-95 | 4 |
| Primal SF-017 | 40 |
| Acrysol TT-615 | 1 |
| Acrysol DR-1 | 1 |
| Viscalex HV-30 | 6 |
| Acrysol I-62 (50% AASP dispersion) | 8 (dry AASP = 4) |
| Pigment: BU 524 | 80 |
| Water | q.s. 200 L |

Example 29

Absolute matte: carbon black

| Ingredient | Quantity (kg) |
| --- | --- |
| Surfynol CT-171 | 4.3 |
| Orotan 1124 | 0.9 |
| Propylene glycol | 12 |
| Mergal K10N | 0.2 |
| Foamaster NS-1 | 0.5 |
| Envirogen AD surfactant | 0.2 |
| Omyacarb 2 | 50 |
| AMP-95 | 4 |
| Primal SF-017 | 40 |
| Acrysol TT-615 | 1 |
| Acrysol DR-1 | 1 |
| Viscalex HV-30 | 6 |
| Acrysol I-62 (50% AASP dispersion) | 6.6 (dry AASP = 3.3) |
| Pigment: black 43/77vb | 30 |
| Water | q.s. 200 L |

Example 30

Absolute matte: burnt sienna

| Ingredient | Quantity (kg) |
| --- | --- |
| Surfynol CT-171 | 5.6 |
| Orotan 1124 | 2.4 |
| Propylene glycol | 12 |
| Mergal K10N | 0.2 |
| Foamaster NS-1 | 0.5 |
| Envirogen AD surfactant | 0.2 |
| AMP-95 | 4 |
| Primal SF-017 | 40 |
| Acrysol TT-615 | 1 |
| Acrysol DR-1 | 1 |
| Viscalex HV-30 | 7 |
| Acrysol I-62 (50% AASP dispersion) | 10 (dry AASP = 5) |
| Pigment: BS 310 | 80 |
| Water | q.s. 200 L |

Example 31

Absolute matte: cobalt blue hue

| Ingredient | Quantity (kg) |
| --- | --- |
| Surfynol CT-171 | 4.5 |
| Orotan 1124 | 1.5 |
| Propylene glycol | 12 |
| Mergal K10N | 0.2 |
| Foamaster NS-1 | 0.5 |
| Envirogen AD surfactant | 0.2 |
| Omyacarb 2 | 70 |
| AMP-95 | 4 |
| Primal SF-017 | 45 |
| Acrysol TT-615 | 1 |
| Acrysol DR-1 | 1 |
| Viscalex HV-30 | 8 |
| Acrysol I-62 (50% AASP dispersion) | 11.5 (dry AASP = 5.75) |
| Pigment: RCL 595 | 9 |
| Water | q.s. 200 L |

Method

Working conditions when artists do a painting tend to be variable and outside of the control of artists using water based paints.

As noted earlier, as soon as the water phase evaporates from a conventional acrylic paint composition after application to a palette or substrate, they become dry and not able to be reworked.

The inventor has previously shown, that when a paint compositions containing AASP and a substituted amine (as herein before described) is used by an artist, it is possible to maintain a painting in a wet state by supplying more water to compensate for the water evaporation that is taking place. However, it is operationally difficult to do this, especially for a large painting or for example when working outdoors. In such cases it is difficult to prevent the paint composition from drying and becoming unworkable.

The inventor has found that by adopting the method disclosed herein the paint composition can be wet or rewet using an alcohol solution to extend or re-access the open time of the paint composition to enable the artist to continue painting on the substrate. Accordingly, the step of contacting an unworkable paint composition with an alcohol solution to maintain a workable wet painting condition is easy to carry out because the alcohol solution is capable of rewetting the dry paint composition containing the AASP and substituted amine, and this gives the artists full control of the painting process, regardless of the working conditions, or the size of the painting, or even the especially unfavourable conditions which apply when working plain air (outdoors).

Instead of having to monitor drying times under different working conditions it is now possible for an artist to paint wet in wet throughout a full day and even several days later when using the method disclosed herein, and this includes specifically targeting certain areas of a dry painting for readjustment when desired.

The method disclosed herein also allows the acrylic artist to paint in layers. They can overpaint because the alcohol evaporates. This is in contrast to other commercially available acrylic paints (eg Golden Open) which include large quantities of propylene glycol. Although the propylene glycol allows the open time to be extended, the propylene glycol remains in the paint, sometimes for several days, which does not enable the artist to paint layer upon layer.

The above compositions of were prepared and used under studio conditions and outdoors to prepare artworks on the substrate of canvas using conventional palettes and brushes.

The compositions were roughly applied to a canvas substrate using a paint brush with the aim of providing an uneven coat. A consistent number of coats were applied to provide a paint composition of roughly uneven texture, i.e so that some areas of the canvas have a thin covering of paint composition while others have a thicker covering.

The paint compositions were allowed to dry so that the paint was no longer workable under ambient temperature and humidity. The paint was considered unworkable when the section of paint composition under consideration satisfied the "dry to the touch" test, ie where the paint composition felt dry to the touch of the human finger signifying that that section had dried and was no longer workable. Varying degrees of drying were conducted to assess the different amounts of alcohol solution required to re-open the dry paint compositions. The drying time of the paint compositions ranged from 1 hour to 5 days.

The paint compositions were then contacted with an alcohol solution of isopropyl alcohol 50% and water 50%. This is achieved by dipping the paint brush into an aqueous isopropyl alcohol solution (50%) and applying the brush containing the alcohol solution to the dry paint composition to be re-opened. Spraying the alcohol solution onto the canvas may be a more convenient way for the artist to work on a particular painted area.

If an alcohol solution is used in conjunction with the paint in the painting process, then it that is possible to maintain the paint in a wet state regardless of the climatic conditions, and when the painting is finished it will dry rapidly because of the fast evaporation rate of the alcohol.

Results

In the above examples, the alkali soluble polymer (Acrysol I-62) in the range of 6.6-10 kg (wet) per 200 litres in the paint composition allowed the alcohol/water solution to rewet the dried paint. It was found that paint that had recently dried (i.e. within a few hours of drying) was easier to rewet than paints that had been dried for a longer period (i.e. greater than 12 hours).

It will be appreciated that the speed of drying of the paint composition will be dependent on the surrounding environmental conditions and the thickness of the paint composition under consideration. Likewise the amount of aqueous alcohol solution required to re-open the paint composition will be dependent on the amount of amine and water that has evaporated from the paint composition. There is a correlation between longer drying time and the requirement of a longer re-wetting time and the amount of aqueous alcohol solution required to re-wet a paint composition.

As noted earlier, paints in which the substituted amine had evaporated resulted in a slower re-wetting process. This was evidenced by it taking longer for the alcohol solution to be absorbed into the paint composition Once the "open time" is re-opened by the addition of aqueous alcohol, the paint compositions are able to be further manipulated by the further addition of one or more mediums selected from the group consisting of: water; a medium comprising an aqueous alcohol; a medium comprising an alcohol and alkali soluble polymer and at least one substituted amine; and a medium comprising at least one water dispersible acrylic polymer (for example, in the form of fresh wet paint). It was found that "wet in wet" painting techniques could be exercised for a full day and in some portions of the artworks on a second day, provided that one or more of the above mediums was applied to the paint composition.

The present invention gives an artist flexibility and considerably more time to develop an artistic piece while still retaining the benefits of using water-based acrylic paints (such as low amounts of volatile organic compounds, excellent colour retention and brushes being able to be washed out in water). The invention provides a method of controlling a paint composition by re-opening an unworkable paint composition and controlling the open time thereafter with the addition of different mediums.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The steps, features, integers, compositions and/or compounds disclosed herein or indicated in the specification of this application individually or collectively, and any and all combinations of two or more of said steps or features.

The invention claimed is:

1. A method of re-accessing the open time of an unworkable artists' paint composition, wherein the paint composition comprises:

i) at least one alkali and alcohol soluble polymer (AASP) said polymer being selected from the group consisting of polymers soluble at ambient temperature and pressure in an aqueous solution having a pH of from about 7 to about 11 and an alcohol;

ii) at least one substituted amine in an amount effective to adjust the pH to about 8 to about 11, said amine selected from the group consisting of $C_{1-6}$ alcohol amines, $C_{1-6}$ alkyl $C_{1-6}$ alcohol amines and mixtures thereof;

iii) a binding effective amount of at least one water dispersible acrylic polymer; and;

the method comprising contacting the unworkable paint composition with an alcohol solution selected from the group consisting of methanol, ethanol, propanol, isopropyl alcohol (IPA), butanol, butyl icinol and methylated spirits, in an amount effective to re-access the open time of the unworkable paint composition and form a workable paint composition.

2. A workable paint composition obtained by the method of claim 1.

3. A method of controlling the open time of a workable water-based acrylic artists' paint composition comprising at least one alkali and alcohol soluble polymer (AASP) and at least one substituted amine selected from the group consisting of $C_{1-6}$ alcohol amines, $C_{1-6}$ alkyl $C_{1-6}$ alcohol amines and mixtures thereof in an amount effective to adjust the pH to about 8 to about 11, the method comprising contacting the paint composition with an alcohol solution and optionally one or more of:

(a) water; and (b) a medium comprising at least one alkali soluble polymer and at least one substituted amine selected from the group consisting of $C_{1-6}$ alcohol amines, $C_{1-6}$ alkyl $C_{1-6}$ alcohol amines and mixtures thereof in an amount effective to adjust the pH to about 8 to about 11; and (c) a medium comprising at least one water dispersible acrylic polymer;

wherein the alcohol solution is selected from the group consisting of methanol, ethanol, propanol, isopropyl alcohol (IPA), butanol, butyl icinol and methylated spirits.

4. The method of claim 3 wherein the workable water-based acrylic artists' paint composition is obtained by treating an unworkable water-based acrylic artists' paint composition with an alcohol solution.

5. The method of claim 3 wherein contacting the paint composition with the alcohol solution and optionally one or more of a)-c) takes place periodically so as to provide a workable paint composition.

6. The method of claim 1, wherein the water-based artists' paint composition comprises:

at least one pigment in an effective amount to provide the desired pigmentation;

at least one alkali and alcohol soluble polymer (AASP) in an amount effective to increase the open time of the composition, said polymer being selected from the group consisting of polymers soluble at ambient temperature and pressure in an aqueous solution having a pH of from about 7 to 11 and an alcohol solution;

at least one substituted amine in an amount effective to adjust the pH to about 8 to 11, said amine selected from the group consisting of $C_{1-6}$ alcohol amines, $C_{1-6}$ alkyl $C_{1-6}$ alcohol amines and mixtures thereof;

a binding effective amount of at least one water dispersible acrylic polymer;

an effective amount of at least one alkali soluble or alkali swellable thickener; and optionally includes one or more additives including dispersants, rheology modifiers, defoamers, coalescents and preservatives.

7. The method of claim 6 wherein the at least one alkali soluble polymer is soluble at ambient temperature and pressure in an aqueous solution having a pH of from 8 to 9.5 and the at least one substituted amine is in an amount effective to adjust the pH to 8 to 9.5.

8. The method of claim 6 wherein the at least one alkali soluble polymer is present in an amount in the range of 2-10 kg/200 L and wherein the weight ratio of alkali soluble polymer to water dispersible acrylic polymer is in the range from 1:4 to 1:20 or in the range of 1:1 to 1:3.

9. The method of claim 6 wherein the at least one substituted amine is selected from the group consisting of aminomethylpropanol (AMP), monoethanolamine (MEA), diethanolamine (DEA) and triethanolamine (TEA) and mixtures thereof.

10. The method of claim 6 wherein the alkali and alcohol soluble polymer is in an amount effective to control the open time of the paint composition or re-wet a paint composition and/or extend the open time of the paint composition.

11. The method of claim 1 wherein the unworkable artists' paint composition has been drying for a period of within an hour up to 5 days or before the amine completely evaporates, or for a period of within an hour up to 3 days, or for a period of within an hour up to 12 hours, or within an hour up to 6 hours.

12. The method of claim 1 wherein the alcohol solution is an aqueous solution.

13. A method of painting a substrate comprising:

applying to the substrate a workable paint composition and contacting the artists' paint composition with an alcohol solution selected from the group consisting of methanol, ethanol, propanol, isopropyl alcohol (IPA), butanol, butyl icinol and methylated spirits, in an amount sufficient to wet the artists' paint composition so that it is in a workable state, wherein the paint composition comprises i) at least one alkali and alcohol soluble polymer (AASP) in an amount effective to increase the open time of the composition, said polymer being selected from the group consisting of polymers soluble at ambient temperature and pressure in an aqueous solution having a pH of from about 7 to about 11 and an alcohol;

ii) at least one substituted amine in an amount effective to adjust the pH to about 8 to about 11, said amine selected from the group consisting of $C_{1-6}$ alcohol amines, $C_{1-6}$ alkyl $C_{1-6}$ alcohol amines and mixtures thereof; and iii) a binding effective amount of at least one water dispersible acrylic polymer.

14. The method of claim 13 wherein the paint composition is applied to the substrate and allowed to dry to a semi-wet state, such that the paint composition is transitioning from a wet to a dry state.

15. The method of claim 13 wherein the paint composition is applied to the substrate and allowed to dry to an unworkable state.

16. The method of claim 13 wherein the substrate is selected from the group including canvas, Masonite, wood, plastic, metal and paper.

17. The method of claim 13 wherein the alcohol solution is sprayed onto the paint composition.

18. The method of claim 13 wherein the alcohol solution is contacted with the paint composition by dipping an implement, such as a paint brush, into the alcohol solution and applying it the paint composition.

* * * * *